(12) United States Patent
Nogami et al.

(10) Patent No.: US 11,666,000 B2
(45) Date of Patent: Jun. 6, 2023

(54) RIDING-TYPE MOWER

(71) Applicant: Kubota Corporation, Osaka (JP)

(72) Inventors: Kazuaki Nogami, Sakai (JP);
 Yoshikazu Togoshi, Sakai (JP);
 Takahiro Shiraga, Sakai (JP); **Eiji
 Sato, Sakai (JP); Seiya Yoshida**, Sakai
 (JP)

(73) Assignee: Kubota Corporation, Osaka (JP)

( * ) Notice: Subject to any disclaimer, the term of this patent is extended or adjusted under 35 U.S.C. 154(b) by 396 days.

(21) Appl. No.: 16/876,585

(22) Filed: May 18, 2020

(65) Prior Publication Data

US 2020/0281124 A1  Sep. 10, 2020

Related U.S. Application Data

(62) Division of application No. 15/837,272, filed on Dec. 11, 2017, now Pat. No. 10,694,676.

(30) Foreign Application Priority Data

Feb. 23, 2017 (JP) .............................. JP2017-032213
Mar. 24, 2017 (JP) .............................. JP2017-059613

(51) Int. Cl.
  *A01D 34/00* (2006.01)
  *B60K 11/06* (2006.01)
  *F01P 5/06* (2006.01)
  *A01D 75/18* (2006.01)
  *A01D 34/66* (2006.01)
  *F01P 5/08* (2006.01)
  *F01P 11/10* (2006.01)

(52) U.S. Cl.
 CPC ........... *A01D 75/18* (2013.01); *A01D 34/001* (2013.01); *A01D 34/667* (2013.01); *B60K 11/06* (2013.01); *F01P 5/06* (2013.01); *F01P 5/08* (2013.01); *F01P 11/10* (2013.01)

(58) Field of Classification Search
 CPC .... A01D 75/18; A01D 34/001; A01D 34/667; B60K 11/06; F01P 5/06; F01P 5/08; F01P 5/02; F01P 11/10
 See application file for complete search history.

(56) References Cited

U.S. PATENT DOCUMENTS

| 4,787,646 | A | 11/1988 | Kamlukin et al. |
| 5,029,668 | A | 7/1991 | Murakawa et al. |
| 7,540,135 | B2 | 6/2009 | Strope |

(Continued)

FOREIGN PATENT DOCUMENTS

| JP | H4117213 A | 4/1992 |
| JP | 2001199251 A | 7/2001 |

(Continued)

*Primary Examiner* — Jacob M Amick
(74) *Attorney, Agent, or Firm* — The Webb Law Firm

(57) ABSTRACT

In a riding-type mower, a vehicle body includes a rear portion in which a pair of right/left vehicle body frames extend in a front-rear direction relative to the vehicle body, with a gap therebetween in a lateral width direction. A mowing device is configured to discharge mown grass rearward relative to the vehicle body such that the mown grass falls onto the ground. A cover is provided in a bottom portion of the vehicle body, at a position that is rearward of the mowing device, and covers a gap between the pair of right/left vehicle body frames.

5 Claims, 14 Drawing Sheets

(56) References Cited

U.S. PATENT DOCUMENTS

| | | |
|---|---|---|
| 7,559,295 B2 | 7/2009 | Yamada et al. |
| 2011/0239615 A1 | 10/2011 | Hirose et al. |
| 2016/0193912 A1* | 7/2016 | Minoura ................ B60K 13/04 |
| | | 180/309 |

FOREIGN PATENT DOCUMENTS

| | | | |
|---|---|---|---|
| JP | 2003327172 | A | 11/2003 |
| JP | 2005204670 | A | 8/2005 |
| JP | 2006238800 | A | 9/2006 |
| JP | 20104783 | A | 1/2010 |
| JP | 201051278 | A | 3/2010 |
| JP | 2012071796 | A | 4/2012 |
| JP | 2016124428 | A | 7/2016 |

* cited by examiner

RIDING-TYPE MOWER

CROSS-REFERENCE TO RELATED APPLICATIONS

This application is a divisional application of U.S. patent application Ser. No. 15/837,272, filed Dec. 11, 2017, which claims priority to Japanese Patent Applications Nos. 2017-032213 and 2017-059613, filed Feb. 23, 2017 and Mar. 24, 2017, respectively, the disclosures of which are hereby incorporated in their entirety by reference.

BACKGROUND OF THE INVENTION

1. Field of the Invention

The present invention relates to a work vehicle such as a riding-type mower.

2. Description of the Related Art (1) First Related Art

For example, a riding-type mower disclosed in JP 2012-071796 A is configured to perform a mowing work while discharging grass that has been mown by a mowing device to a mowing trace. This mower includes a bar blade type mower unit between the front wheels and the rear wheels of a self-propelled vehicle body. The mower unit is configured as a rear discharge type mower unit.

Conventionally, mown grass that has been discharged from the mowing device and has been blown up is likely to enter a gap between right and left vehicle body frames. If mown grass enters the gap between the vehicle body frames, mown grass adheres to, or are deposited on, various devices, and causes malfunction of the devices.

Thus, there is demand for a riding-type mower that can prevent mown grass from entering the gap between the vehicle body frames.

(2) Second Related Art

In order to mitigate and solve environmental problems in recent years, emission gas regulations for diesel engines and the like have been tightened. In order to comply with such emission gas regulations, various technologies for reducing particulate matter contained in an emission gas have been developed, also for work vehicles such as construction machines and agricultural machines. For example, instead of a conventional muffler, an emission gas purification device that collects particulate matter contained in an emission gas is installed in a work vehicle. The emission gas purification device collects particulate matter by passing an emission gas through a diesel particulate filter (hereinafter simply referred to as "DPF") that is provided in the emission gas purification device. The collected particulate matter is gradually deposited on the DPF of the emission gas purification device. Therefore, it is necessary to renew the DPF by burning the particulate matter and removing it, to prevent the DPF from being clogged and air pressure in the emission system from increasing. Therefore, it is necessary to avoid excessively cooling the outer surface of the emission gas purification device into which the DPF is built, and it is also necessary to effectively cool an exhaust pipe, to lower the temperature of an emission gas that is discharged from the emission gas purification device to the outside.

A work vehicle disclosed in JP 2016-124428 A (or US 2016/0193912 A1 corresponding thereto) is configured as a riding-type mower, in which a mower unit is provided below a vehicle body frame, between: a pair of right/left front wheels; and a pair of right/left rear wheels. A driver's seat is formed in a central portion of the vehicle body frame, and an engine room, which is covered by a hood, is provided in a rear portion of the vehicle body frame. The engine and engine accessories are arranged in the engine room. The engine is a diesel engine with a radiator and a cooling fan, which are disposed on the front side of the engine. A DPF (an emission gas purification device) that purifies an engine emission gas is provided at a position that is rearward of and above the diesel engine, and an air cleaner is provided at a position above the engine. An emission gas that flows in from an area that is forward of and on the left side of the DPF is guided to flow downward relative to the vehicle body, from an exhaust port on the right side of the DPF, and is discharged to the outside of the machine from an end portion opening, which faces to the left of the vehicle body, via an exhaust pipe, which extends from the lower end to the left of the vehicle body in a horizontal direction.

A riding-type mower disclosed in JP 2016-124428 A (or US 2016/0193912 A1 corresponding thereto) is useful from the viewpoint that an engine, engine accessories, and a DPF are arranged in a relatively compact engine hood so that the outer surface of the DPF is prevented from being excessively cooled, while the distance from the exhaust port of the DPF to the end of the exhaust pipe is set to be relatively long so that the temperature of an emission gas can be lowered.

In a mower with this configuration, a heat radiation area in the engine hood, such as an exhaust manifold part that extends from the exhaust port of the engine to the DPF, includes an area that has a particularly high temperature. A fan for cooling the engine sends air to such a high-temperature area. Therefore, in normal cases, it is unlikely that mown grass and dust that fly in the engine hood will be deposited on the high temperature area.

However, an area that is further upstream in the direction in which air is sent includes the hoses of the air cleaner, a reserve tank, and so on, which tend to be arranged in a complex state. Therefore, if air from the fan becomes weak in a certain situation, such as a situation where a dustproof net in a front portion of the hood is clogged, there is the risk of mown grass or dust being deposited on the high-temperature area. There is room for improvement in this respect.

That is, there is demand for reducing, as much as possible, a tendency for mown grass and dust to be deposited on a heat radiation area, which is a high-temperature area in the engine hood provided in a rear portion of the vehicle body, using a simple structure.

SUMMARY OF THE INVENTION (1) The riding-type mower as under is proposed in correspondence with First Related Art:

A riding-type mower comprising:

a vehicle body that has a front wheel and a rear wheel, the vehicle body including a pair of right/left vehicle body frames at a rear portion thereof, the right and left vehicle body frames extending in a front-rear direction relative to the vehicle body, with a gap therebetween in a lateral width direction relative to the vehicle body;

a mowing device that is provided between the front wheel and the rear wheel, the mowing device being configured to discharge mown grass rearward relative to the vehicle body such that the mown grass falls onto the ground; and a cover that is provided in a bottom portion of the vehicle body at a position rearward of the mowing device, and covers a gap between the pair of right/left vehicle body frames.

With this configuration, even if mown grass that has been discharged from the mowing device is blown up, the cover prevents the mown grass from entering the gap between vehicle body frames. Therefore, it is less likely that mown grass causes malfunction of various devices, and it is possible to efficiently perform the mowing work.

In one preferred embodiment, the cover is fitted into a gap between lower end portions of the pair of right/left vehicle body frames. With this configuration, it is easier to bring the vehicle body frames and the cover into intimate contact, and therefore it is easier to seal the gap between the vehicle body frames and the cover.

In one preferred embodiment, both lateral end portions of the cover protrude from the vehicle body frames, laterally outward relative to the vehicle body. With this configuration, it is easier to prevent mown grass from being blown up to an area that is located laterally outward of the vehicle body frames and entering the gap, and therefore it is less likely that mown grass becomes tangled with a rear wheel, for example.

In one preferred embodiment, the mowing device is supported by the vehicle body such that the mowing device can be raised and lowered, and a front portion of the cover is formed of a rubber plate, and is coupled to the mowing device and the vehicle body. With this configuration, even if the cover is coupled to the mowing device, a front portion of the cover warps when the mowing device is raised and lowered, and the mowing device can be raised and lowered. Therefore, by applying the simple solution, in which a rubber plate is employed and the rubber plate and the mowing device are coupled to each other, it is possible to avoid forming a gap between the mowing device and the cover, and it is possible to prevent mown grass from flowing out of a gap between the mowing device and the cover, to the upper surface side of the mowing device, at low cost.

In one preferred embodiment, an engine is supported by the pair of right/left vehicle body frames, at a position that is rearward of the mowing device. With this configuration, even if mown grass is blown up, it is possible to prevent the mown grass from adhering to the engine.

(2) The work vehicle as under is proposed in correspondence with Second Related Art:

A work vehicle comprising:
a vehicle body;
an engine hood that is installed in a rear portion of the vehicle body;
a diesel engine that is provided in the engine hood;
a cooling fan that is located in the engine hood at a position forward of the diesel engine;
an emission gas purification device that is provided in the engine hood, the emission gas purification device being configured to collect particulate matter contained in an emission gas from the diesel engine;
a cooling air guiding path that is provided in the engine hood, the cooling air guiding path being configured to guide a portion of cooling air from the cooling fan to a heat radiation area to which heat is radiated from the diesel engine and the emission gas purification device;
an air guide that is provided in the engine hood for guiding the cooling air; and
an in-hood element that is provided in the engine hood, at a position upstream of the heat radiation area in a direction in which the cooling air is sent,
wherein the cooling air guiding path is constituted by a gap between the air guide and the in-hood element.

With this configuration, the air guide, which controls the direction in which cooling air from the cooling fan is sent, is located so as to face the in-hood element that is located upstream of the high-temperature area in the direction in which cooling air is sent. The cooling air guiding path, which guides a portion of cooling air from the cooling fan to the high-temperature area, is constituted by a gap between the air guide and the in-hood element that is located upstream of the high-temperature area.

The cooling air guiding path positively guides a portion of cooling air from the cooling fan to the high-temperature area. Therefore, it is easier to send cooling air from the cooling fan to the high-temperature area such that the cooling air is less likely to be affected by members that are arranged inside the engine hood in a complex manner, and such that the cooling air is less likely to decelerate. This configuration has an advantage in that mown grass and dust that fly in the engine hood can be effectively prevented from being deposited in the high-temperature area.

In addition, in the cooling air guiding path, the air guide is located so as to face the in-hood element that is located upstream of the high-temperature area. Thus, the in-hood element that is located upstream of the high-temperature area is also effectively used as a constituent element of the cooling air guiding path. Therefore, it is easier to form a cooling air guiding path that has a simple configuration.

In one preferred embodiment, the cooling air guiding path is formed such that the gap between the air guide and the in-hood element has a rearwardly narrowed shape that is gradually narrowed toward a downstream side in a direction in which cooling air is sent.

With the configuration, the speed of cooling air that flows through the cooling air guiding path that has a rearwardly narrowed shape tends to increase toward the downstream side in a direction in which the cooling air is sent, due to the gap between the air guide and the in-hood element being narrowed toward the downstream side in a direction in which the cooling air is sent. As a result, due to dynamic pressure of cooling air that blows into the high-temperature area, it is easier to effectively prevent mown grass and dust from being deposited.

In one preferred embodiment, the air guide includes a first guide plate that is configured to guide cooling air from the cooling fan in a horizontal direction, and a second guide plate that is configured to guide the cooling air in a top-bottom direction.

With the configuration, it is easier to guide cooling air to the high-temperature area while avoiding members that are arranged in the engine hood in a complex manner, by flexibly changing the direction in which cooling air is sent, to a horizontal direction and a top-bottom direction. Also, it is easier to manufacture an air guide that has a relatively simple configuration, by combining the first guide plate and the second guide plate that guide cooling air in different directions.

In one preferred embodiment, the engine hood is pivotable to be opened/closed about a pivot extending at a rear position thereof,
the second guide plate has an upper guide surface that is located in an upper portion of the cooling air guiding path, and
the upper guide surface is inclined downward in a rearward direction.

With the configuration, even if mown grass and dust that adheres to the dustproof net, which is provided on the front surface of the engine hood, falls off while the engine hood is operated so as to swing to open or close, mown grass and dust that have fallen onto the cooling air guiding path are received by the upper guide surface that is located in an upper portion of the cooling air guiding path. Therefore, it is possible to prevent fallen objects from being deposited at a position where the fallen objects may prevent cooling air from passing through the cooling air guiding path. In addition, the upper guide surface is inclined downward in a rearward direction. Therefore, it is likely that fallen objects that have been received by the upper guide surface naturally slide down rearward due to vibrations generated by the engine, vibrations generated when the vehicle body travels, and so on.

In one preferred embodiment, the work vehicle further comprises: a radiator that is located forward of the cooling fan; and a partition member that extends from a rear end of the radiator to one lateral side of the engine hood. The in-hood element is constituted by one lateral side of the diesel engine, and the partition member, the lateral side facing the air guide.

In one preferred embodiment, the partition member extends to a gap between the cooling fan and the radiator, and serves as a fan shroud.

(3) Other features and advantageous effects that can be produced by these features will become apparent by reading the following description with reference to the accompanying drawings.

DETAILED DESCRIPTION OF PREFERRED EMBODIMENTS

Figure 1:
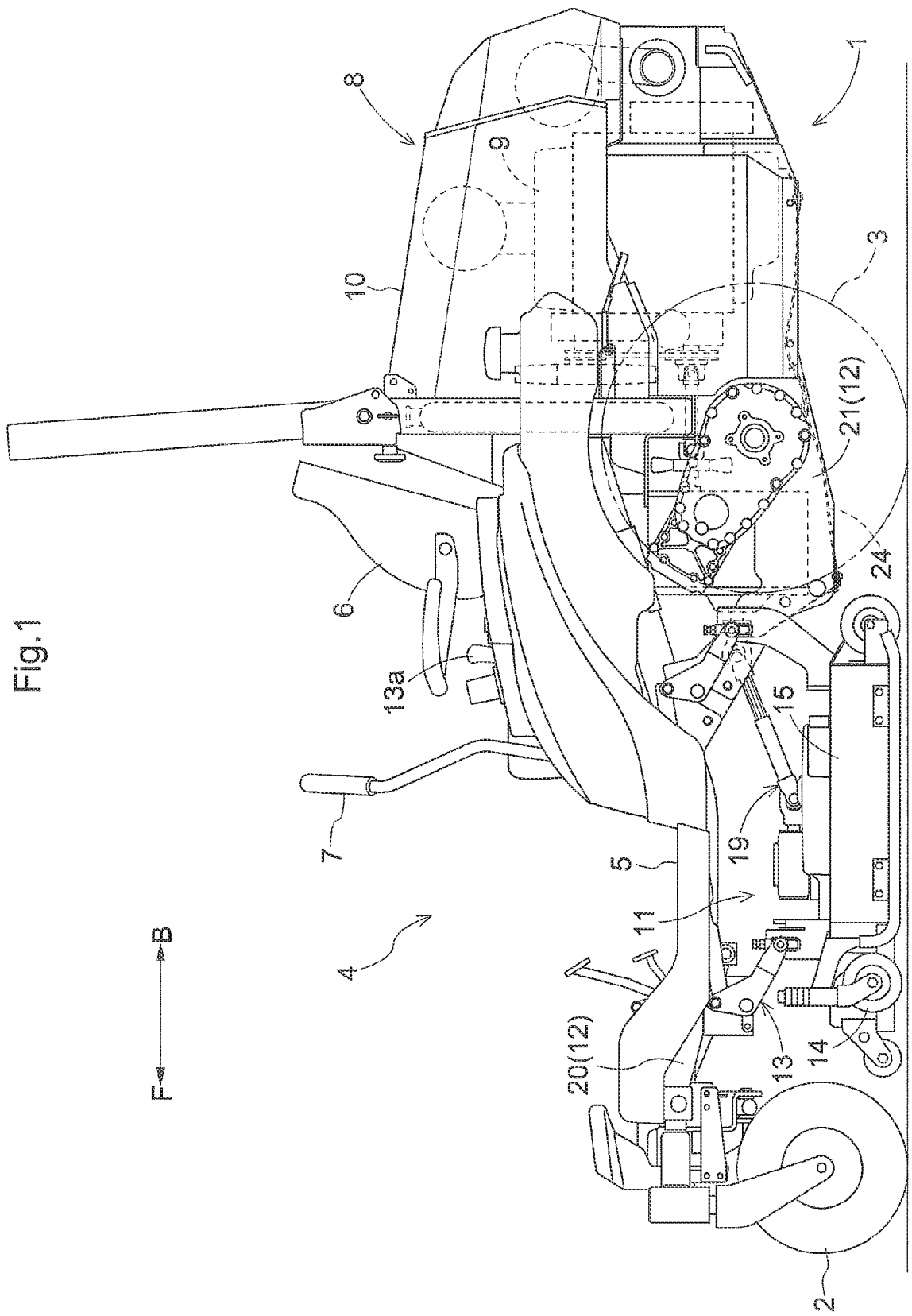
FIG. 1 is a left side view showing the entirety of a riding-type mower.

In each of the embodiments, a direction corresponding to the direction indicated by [F] in FIG. 1 is "forward", a direction corresponding to the direction indicated by [B] in FIG. 1 is "rearward", a direction corresponding to the direction toward the front face of the drawing sheet (the direction indicated by [L] in FIG. 9) is "left", and a direction corresponding to the direction toward the back face of the drawing sheet (the direction indicated by [R] in FIG. 9) is "right", unless otherwise specified.

First Embodiment

Overall Configuration of Riding-Type Mower

As shown in FIG. 1, a riding-type mower includes a self-propelled vehicle body 1 that includes a pair of right/left front wheels 2 and a pair of right/left rear wheels 3. A driving section 4 extends from a front end portion to a central portion of the self-propelled vehicle body 1. The driving section 4 includes a driving step 5, a driver's seat 6, and a pair of right/left manipulation levers 7. A prime mover section 8 is provided in a rear portion of the self-propelled vehicle body 1. The prime mover section 8 includes an engine 9, a radiator (not shown) for cooling the engine 9, and an engine hood 10. The pair of right/left front wheels 2 are formed of caster-type idling wheels. Power from the engine 9 is inputted to a pair of hydraulic static continuously variable transmission devices (not shown), and outputs from the pair of continuously variable transmission devices are respectively transmitted to the pair of rear wheels 3. The pair of continuously variable transmission devices are separately subjected to a shift operation by the pair of right/left manipulation levers 7. The self-propelled vehicle body 1 may travel straight by driving the pair of right/left rear wheels 3 at the same speed in the same rotation direction, and the self-propelled vehicle body 1 may be steered right and left by driving the pair of right/left rear wheels 3 at different speeds and/or in different rotation directions.

A mowing device 11 is provided between the front and rear wheels of the self-propelled vehicle body 1. The mowing device 11 is supported on a vehicle body frame 12 of the self-propelled vehicle body 1 via a linkage mechanism 13. By raising and lowering the linkage mechanism 13 with a raising/lowering lever 13a, the mowing device 11 may be lowered to a lowered working state to engage its gauge wheels 14 with the ground, raised to a raised non-working state in which the gauge wheels 14 are raised above the ground.

The riding-type mower may perform a mowing work after the mowing device 11 is lowered to the lowered working state and the self-propelled vehicle body 1 travels in this state, by cutting grass in an area in front of the self-propelled vehicle with the mowing device 11 and discharging the grass cut the mowing device 11 to a mowing trace.

Configuration of Mowing Device

Figure 2:
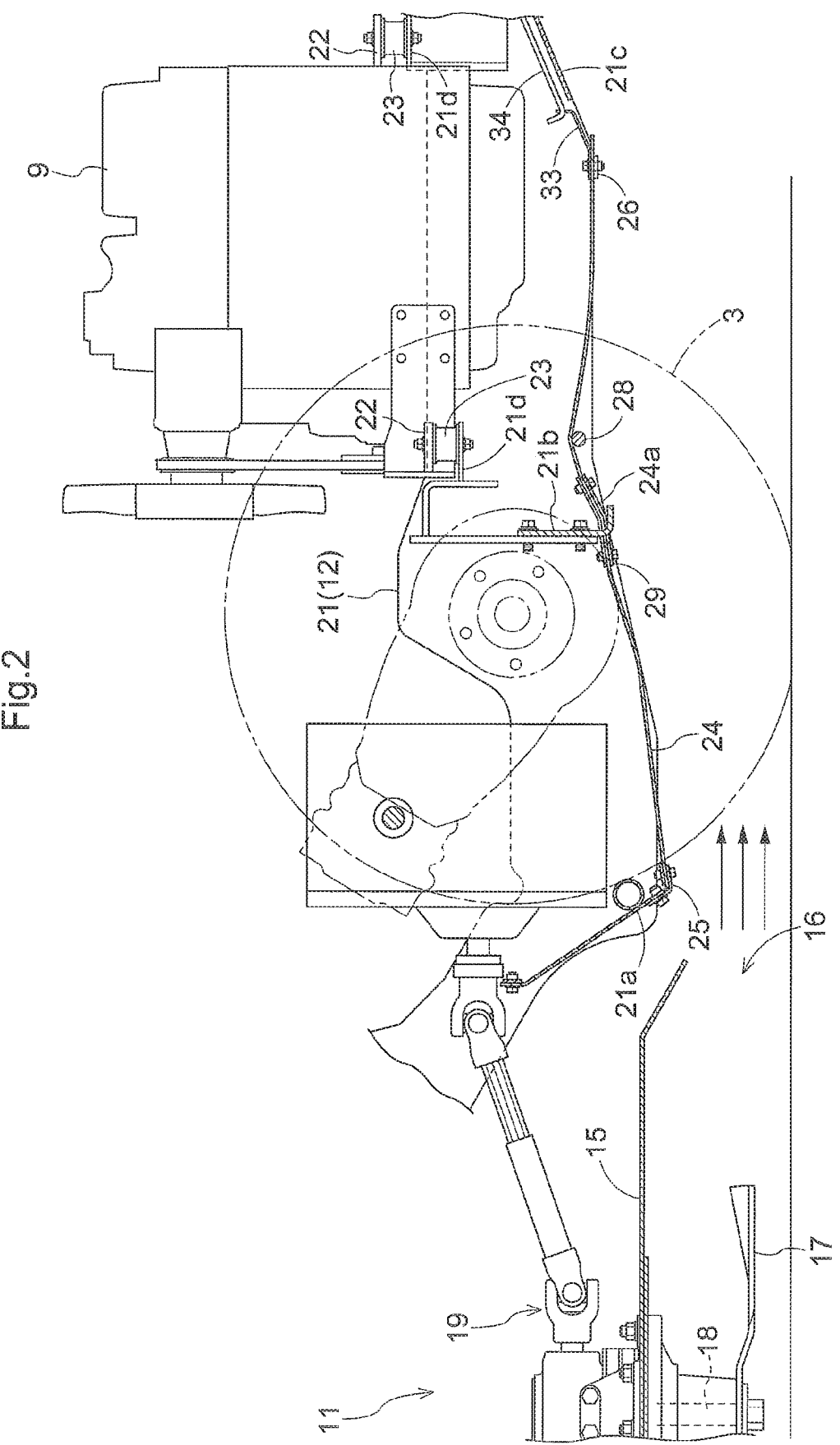
FIG. 2 is a left side view showing a cover according to a first embodiment.
Figure 3:
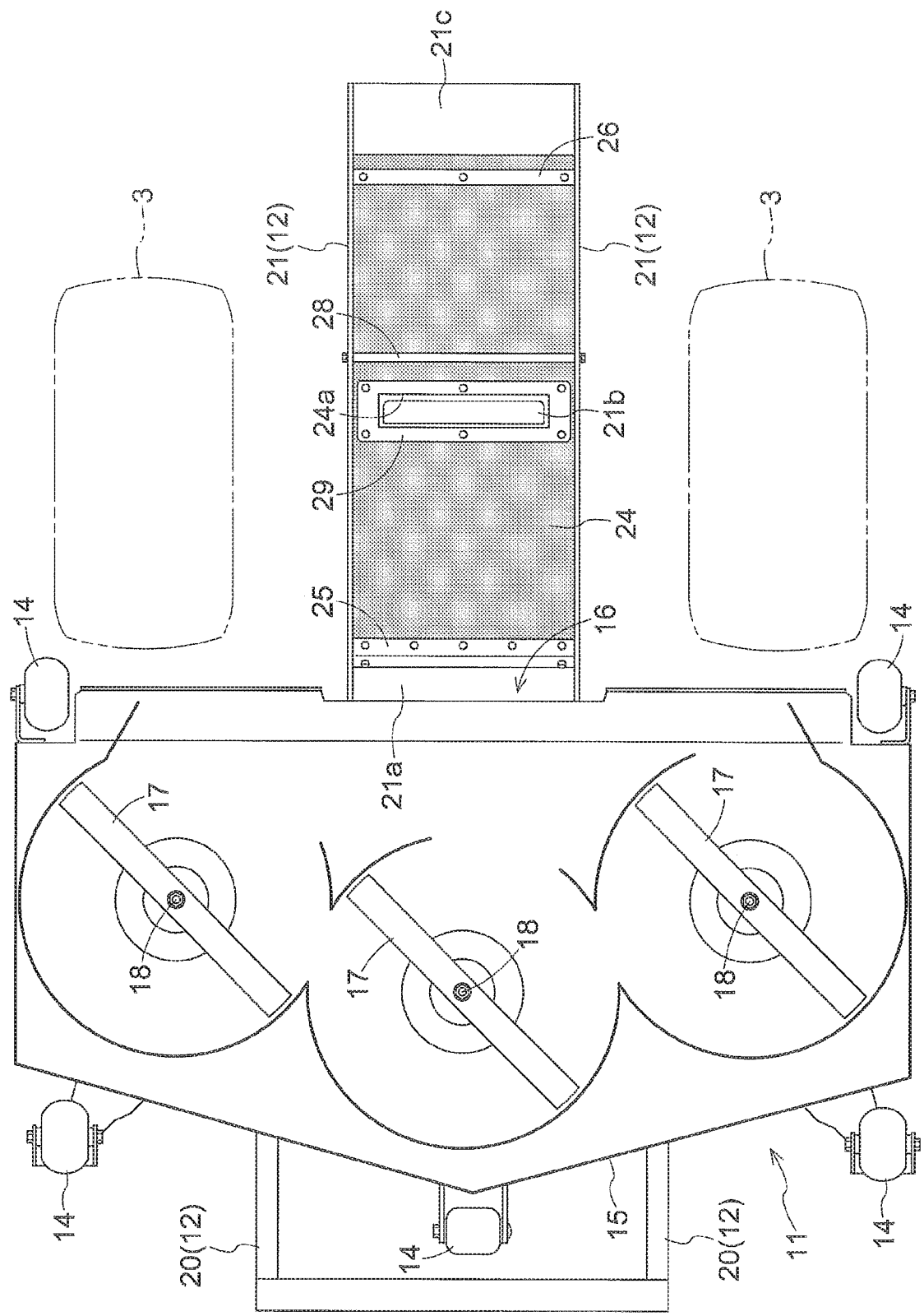
FIG. 3 is a bottom view showing the cover according to the first embodiment.

As shown in FIGS. 1, 2 and 3, the mowing device 11 includes a housing 15. A discharge port 16 is formed in a rear portion of the housing 15. Three blade type mowing cutters 17 are arranged side by side in the housing 15 in a lateral width direction of the self-propelled vehicle body 1. Each mowing cutter 17 is rotatably supported on the housing 15 by a rotation support shaft 18. A driving section 19 is provided on the upper surface of the housing 15.

In the mowing device 11, after power from the engine 9 is transmitted to the driving section 19, the rotation support shafts 18 of the mowing cutters 17 are driven to rotate by the driving section 19, and each mowing cutter 17 is driven to rotate about the axis of its rotation support shaft 18, which is orientated in a top-bottom direction of the vehicle body. The rotating mowing cutters 17 performs the mowing work by cutting grass such as lawn grass. The grass after the mowing work is discharged from the discharge port 16 rearward relative to the self-propelled vehicle body 1, under conveyance air that is generated by the rotation of each mowing cutter 17. The mown grass thus discharged falls onto the ground due to gravity thereof.

Configuration of Self-Propelled Vehicle Body

As shown in FIGS. 1, 2, 3 and 4, the vehicle body frame 12 of the self-propelled vehicle body 1 includes a pair of right/left vehicle body frames 20 for a front portion (hereinafter referred to as "front vehicle body frames 20"), which are provided in a front portion of the self-propelled vehicle body 1 and are orientated in a front-rear direction of the vehicle body; and a pair of right/left vehicle body frames 21 for a rear portion (hereinafter referred to as "rear vehicle body frames 21"), which are provided in a rear portion of the self-propelled vehicle body 1 and are orientated in a front-rear direction of the vehicle body. The rear vehicle body frames 21 correspond to the vehicle body frames according to the present invention.

Figure 4:
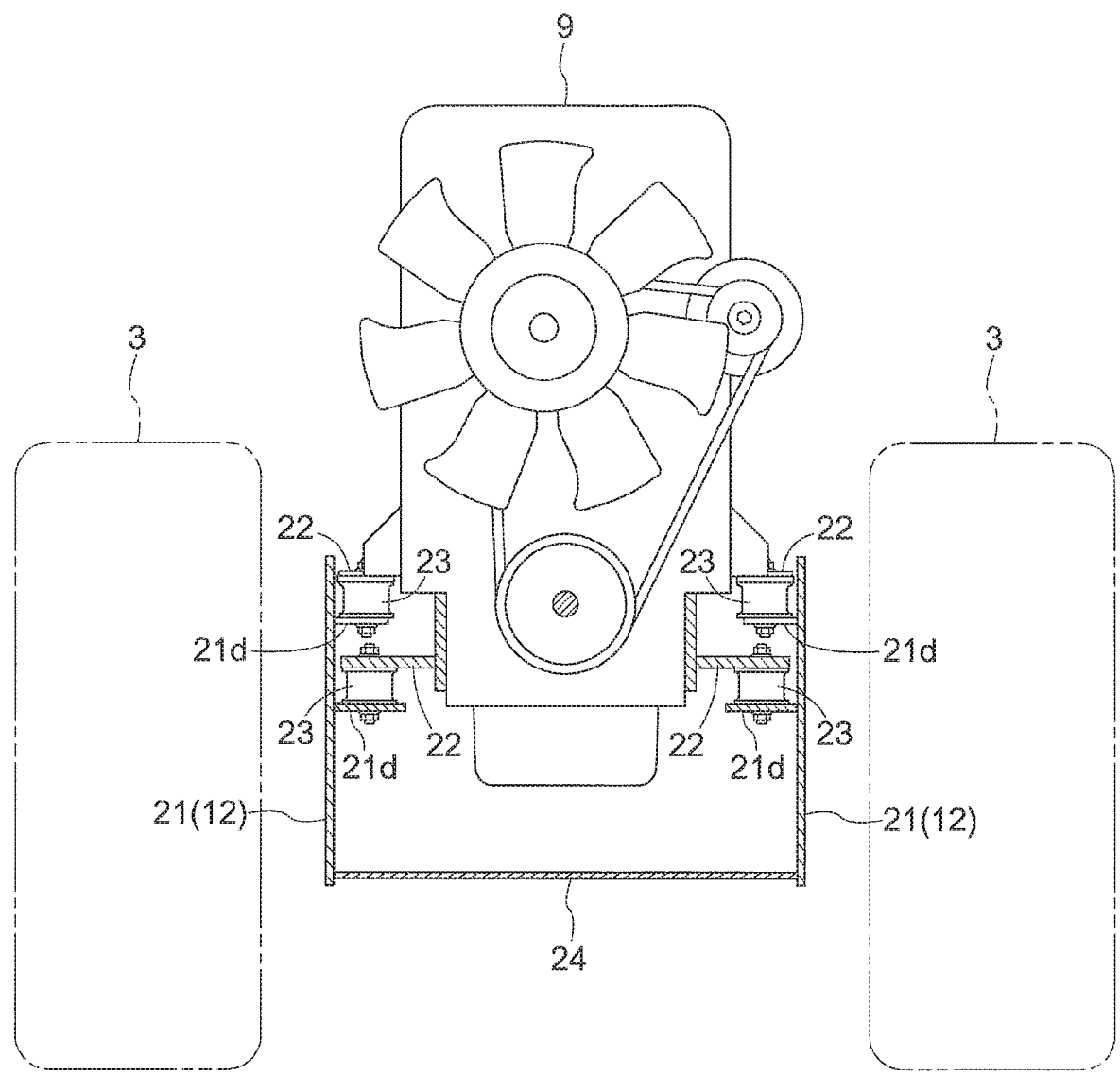
FIG. 4 is a rear view showing the cover according to the first embodiment.

As shown in FIGS. 3 and 4, the pair of right/left front vehicle body frames 20 and the pair of right/left rear vehicle body frames 21 are respectively arranged side by side with a gap therebetween in the lateral width direction of the vehicle body. The pair of right/left rear vehicle body frames 21 are formed of vertical plate members. Rear end portions of the pair of right/left front vehicle body frames 20 and front end portions of the pair of right/left rear vehicle body frames 21 are coupled to each other. Central portions of the pair of right/left rear vehicle body frames 21 are coupled to each other by a central coupling frame 21b that extends in the lateral width direction of the vehicle body. Rear end portions of the pair of right/left rear vehicle body frames 21 are coupled to each other by a rear coupling frame 21c that extends in the lateral width direction of the vehicle body.

As shown in FIGS. 2 and 4, coupling members 22 are supported on both lateral sides of a front end portion of the engine 9 relative to the vehicle body, and on both lateral sides of a rear end portion of the engine 9 relative to the vehicle body. The front and rear coupling members 22 on the left lateral side of the engine 9 are supported by supporting portions 21d of the left rear vehicle body frame 21, via cushion members 23. The front and rear coupling members 22 on the right lateral side of the engine 9 are supported by supporting portions 21d of the right rear vehicle body frame 21, via cushion members 23. The supporting portions 21d of the rear vehicle body frames 21 are formed on the inner surface side of the rear vehicle body frames 21. The engine 9 is supported at a position that is rearward of the mowing device 11, by the right and left rear vehicle body frames 21, via the coupling members 22 and the cushion members 23.

Bottom Cover for Self-Propelled Vehicle Body

As shown in FIGS. 2, 3 and 4, a cover 24 is provided on a bottom portion of the self-propelled vehicle body, at a position that is rearward of the mowing device 11. A gap between the pair of right/left rear vehicle body frames 21 is closed by the cover 24. In the present embodiment, the gap between the pair of right/left rear vehicle body frames 21 is closed by the cover 24, in the range extending from portions of the rear vehicle body frames 21 adjacent the rear end of the mowing device 11 to the rear ends of the rear vehicle body frames 21. The cover 24 prevents entrance of the mown grass, that has been discharged from the mowing device 11 and blown up therefrom, into the gap between the pair of right/left rear vehicle body frames 21; and thus mown grass is prevented from adhering to the engine 9 and equipment around the engine 9.

As shown in FIGS. 2, 3 and 4, the cover 24 is fitted into a gap between the lower end portions of the pair of right/left rear vehicle body frames 21. Thus, the cover 24 may readily come into tight contact with the rear vehicle body frames 21.

Figure 5:
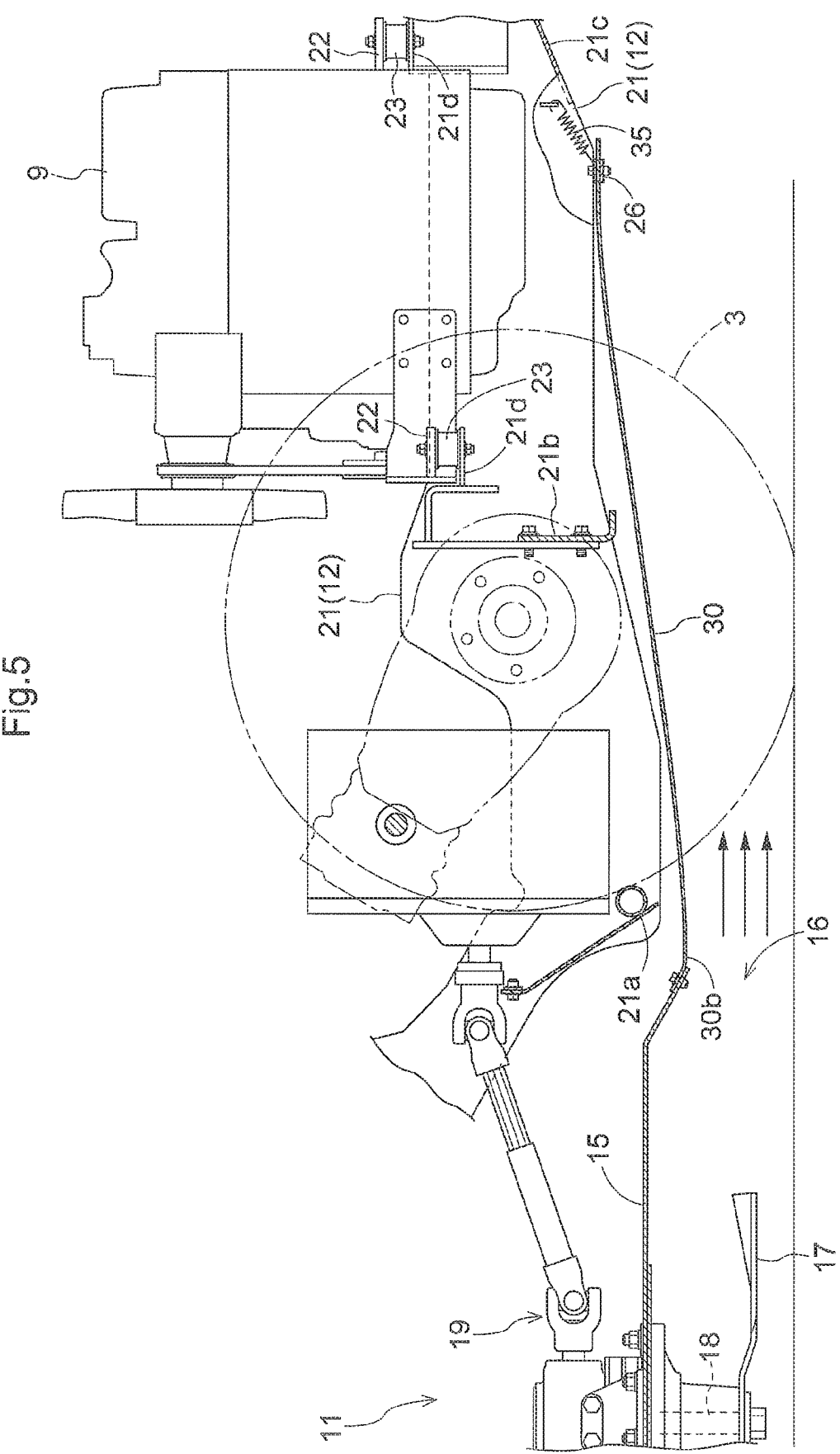
FIG. 5 is a left side view showing a cover according to a second embodiment.

The cover 24 is formed of a translucent resin plate member. As shown in FIGS. 2 and 3, a front end portion of the cover 24 is supported by a front coupling frame 21a. To support the cover 24 on the front coupling frame 21a, front reinforcing plates 25 abut against the outer surface and the inner surface of a front end portion of the cover 24, and a front end portion of the front reinforcing plate 25 on the outer surface is fastened and coupled to the front coupling frame 21a by coupling bolts. A rear end portion of the cover 24 is supported by the rear vehicle body frames 21 inside the rear coupling frame 21c. To support the cover 24 on the rear vehicle body frames 21, a coupling member 33 which is attached to the inner surface of a rear end portion of the cover 24, and a supporting member 34 on the rear vehicle body frames 21, are used. The coupling member 33 is engaged with a hook portion of the supporting member 34. A reinforcing member 26 abuts against the outer surface of the cover 24. As shown in FIGS. 3 and 5, the outer surface of a central portion of the cover 24 in the front-rear direction is received and supported by a supporting bar 28. The supporting bar 28 is coupled to the right and left rear vehicle body frames 21. The cover 24 is supported by the rear vehicle body frames 21 via the front coupling frame 21a, the supporting bar 28 and the supporting member 34.

A cutout hole 24a is formed in a central portion of the cover 24 in the front-rear direction. Reinforcing plates 29 abut against the outer surface and the inner surface of the cover 24 at areas around the cutout hole 24a. A lower end portion of the central coupling frame 21b is fitted into the cutout hole 24a.

In the present embodiment, the cover 24 is formed of a resin plate member. However, other various kinds of members such as a metal plate member and a rubber plate member may be used to form the cover 24.

Second Embodiment

Figure 6:
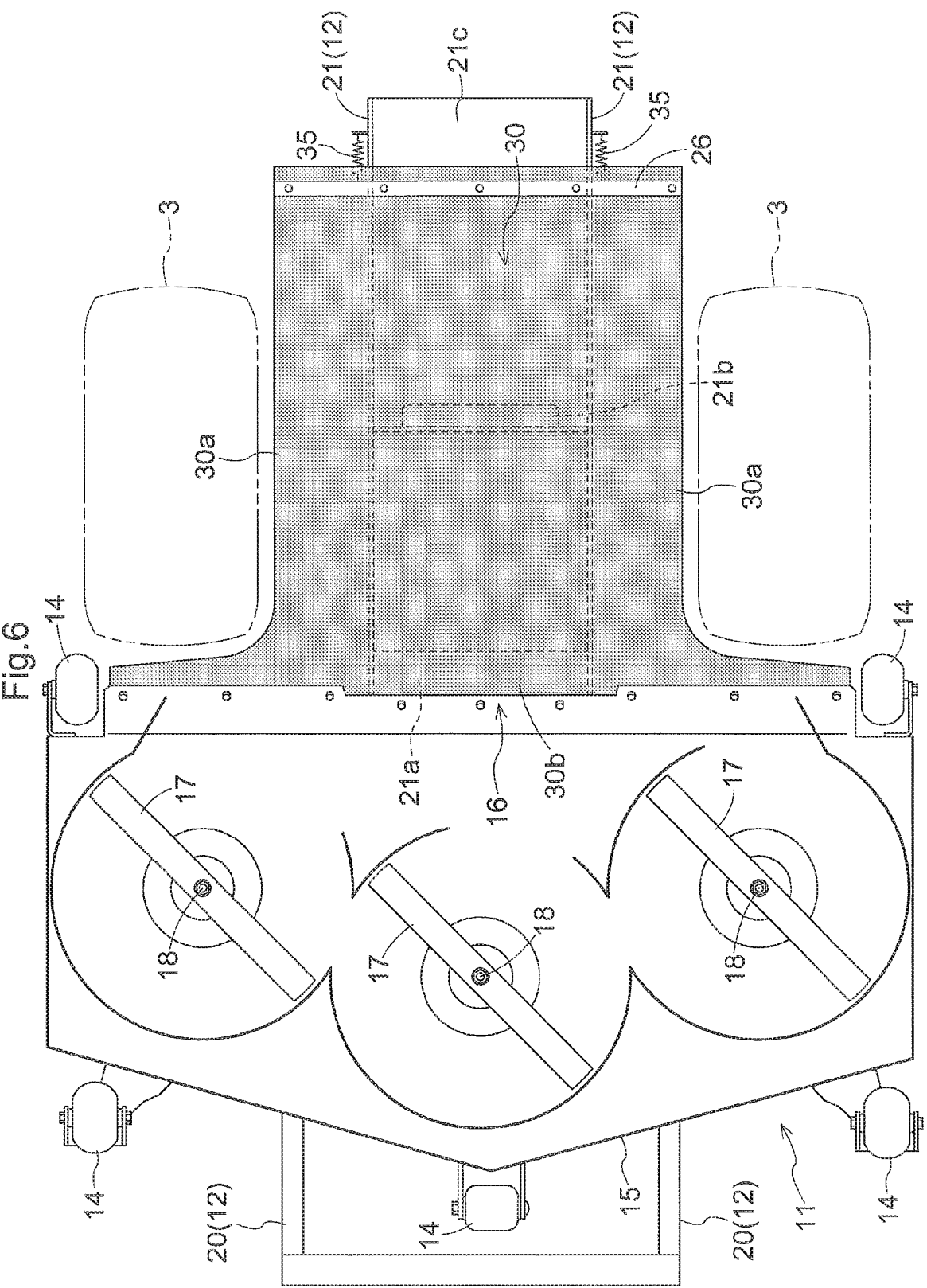
FIG. 6 is a bottom view showing the cover according to the second embodiment.
Figure 7:
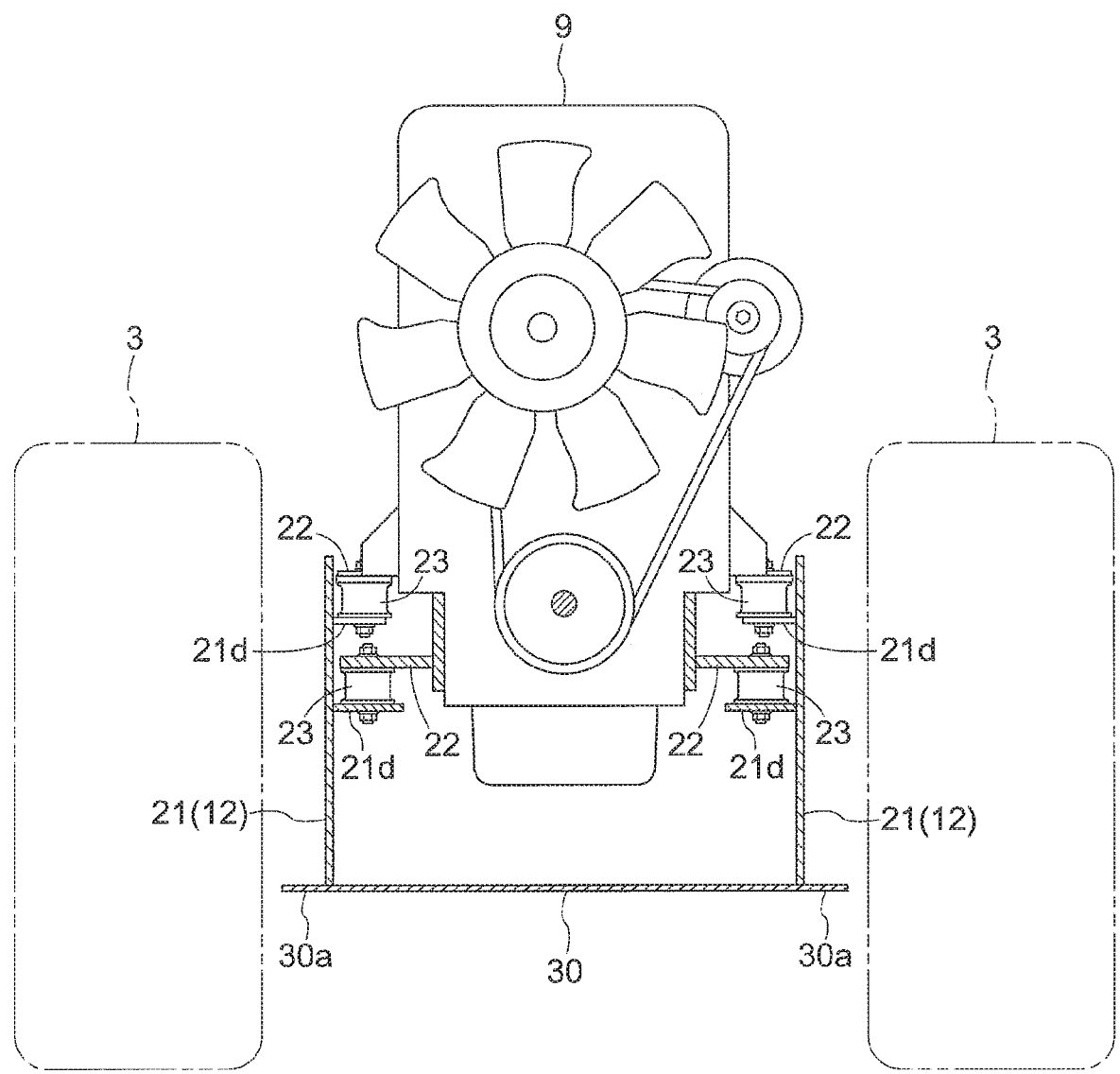
FIG. 7 is a rear view showing the cover according to the second embodiment.

FIG. 5 is a left side view showing a cover 30 with a structure according to a second embodiment. FIG. 6 is a bottom view showing the cover 30 with the structure according to the second embodiment. FIG. 7 is a rear view showing the cover 30 with the structure according to the second embodiment. As shown in FIGS. 5, 6 and 7, in the cover 30 with the structure according to the second embodiment, both lateral end portions 30a of the cover 30 protrude from the pair of right/left rear vehicle body frames 21, laterally outward relative to the vehicle body.

As shown in FIGS. 5 and 6, a front portion 30b of the cover 30 is supported by the housing 15 of the mowing device 11 at a portion thereof above the discharge port 16. A rear end portion of the cover 30 is supported, via springs 35, by the rear vehicle body frames 21 at positions that are located laterally outward of the rear vehicle body frames 21 relative to the vehicle body. A reinforcing member 26 abuts against the outer surface of a portion of the cover 30 to which the springs 35 are coupled. When the mowing device 11 is raised or lowered, the front portion 30b of the cover 30 warps due to the flexibility of a rubber, and the entirety of the cover 30 moves back and forth due to the springs 35 expanding and contracting, so that a gap is not formed between the mowing device 11 and the cover 30. Also, the mowing device 11 may be raised and lowered with a small operational force.

In the present embodiment, the entirety of the cover 30 is formed of a rubber plate, and thus the front portion 30b is formed of a rubber plate so as to be flexible. However, only the front portion 30b, which is coupled to the mowing device 11, may be formed of a rubber plate, and a portion of the cover 30 that is rearward of the front portion 30b may be formed using a member that is not flexible, such as a resin plate member or a metal plate member.

Other Embodiments Modified from First and Second Embodiments (1) In the first embodiment, the cover 24 is not coupled to the mowing device 11. However, as in the second embodiment, the front portion of the cover 24 may be formed of a rubber plate to be coupled to the mowing device 11.
(2) In the foregoing embodiments, the front wheels 2 are caster-type idling wheels. However, the front wheels 2 may be configured as steerable wheels that may be steered upon a steering wheel being rotated.
(3) In the foregoing embodiments, the engine 9 is supported by the rear vehicle body frames 21. However, the engine 9 may be provided in a front portion of the self-propelled vehicle body.
(4) In the foregoing embodiments, the mowing device discharges mown grass only rearward relative to the vehicle body. However, a mowing device may be switched to a state in which mown grass is discharged rearward relative to the vehicle body and another state in which mown grass is discharged laterally outward relative to the vehicle body.
(5) That is, in the foregoing embodiments, a riding-type mower may discharge mown grass only rearward relative to the vehicle body. However, the riding-type mower may be configured to be switchable to a state in which mown grass is discharged rearward relative to the vehicle body, and another state in which mown grass is discharged laterally outward relative to the vehicle body.

Third Embodiment

Overall Configuration

Figure 8:
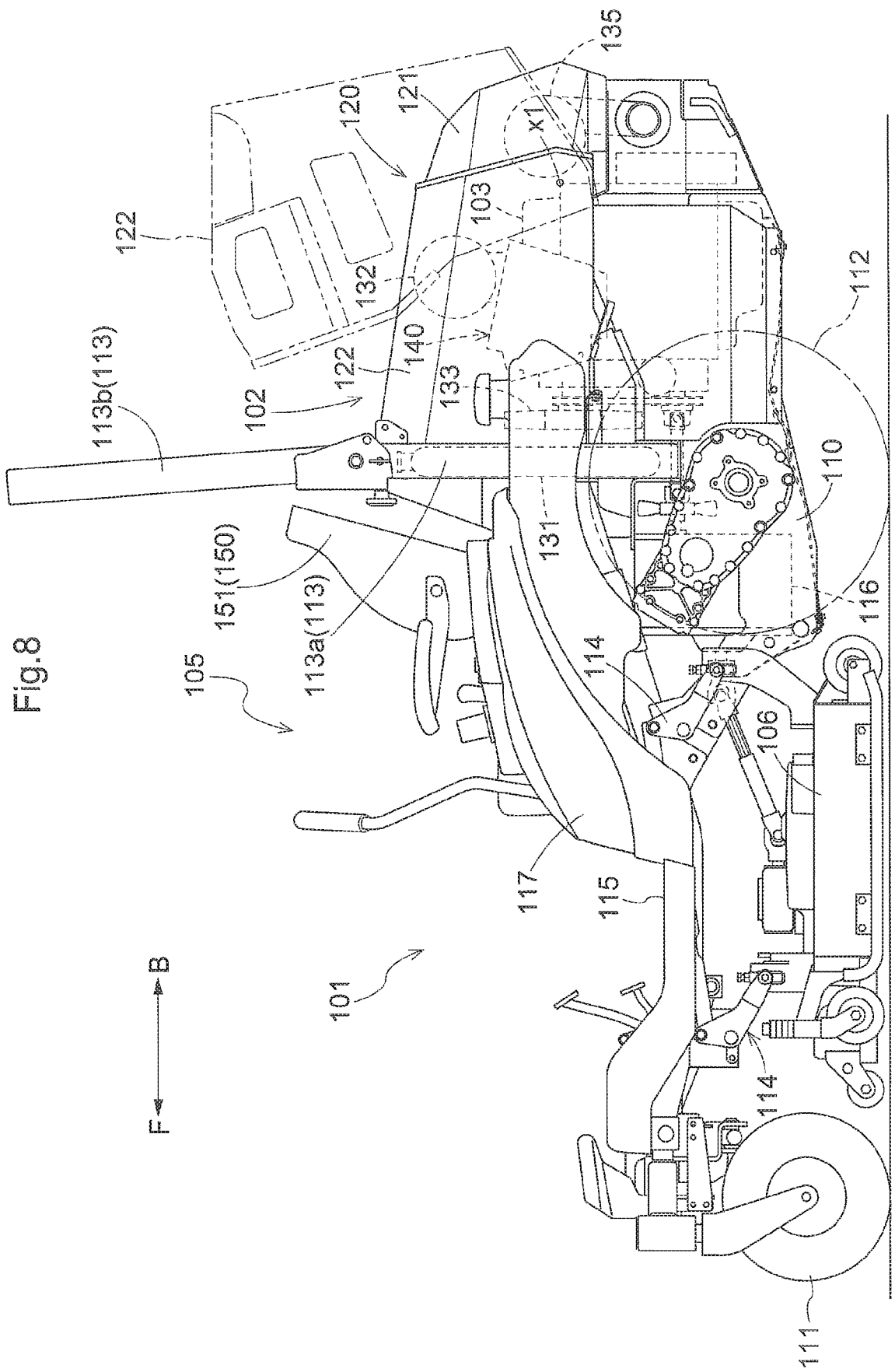
FIG. 8 is a side view of a riding-type mower (here, a zero-turn mower), which is an example of a work vehicle, according to a third embodiment (the same applies up to FIG. 14).
Figure 9:
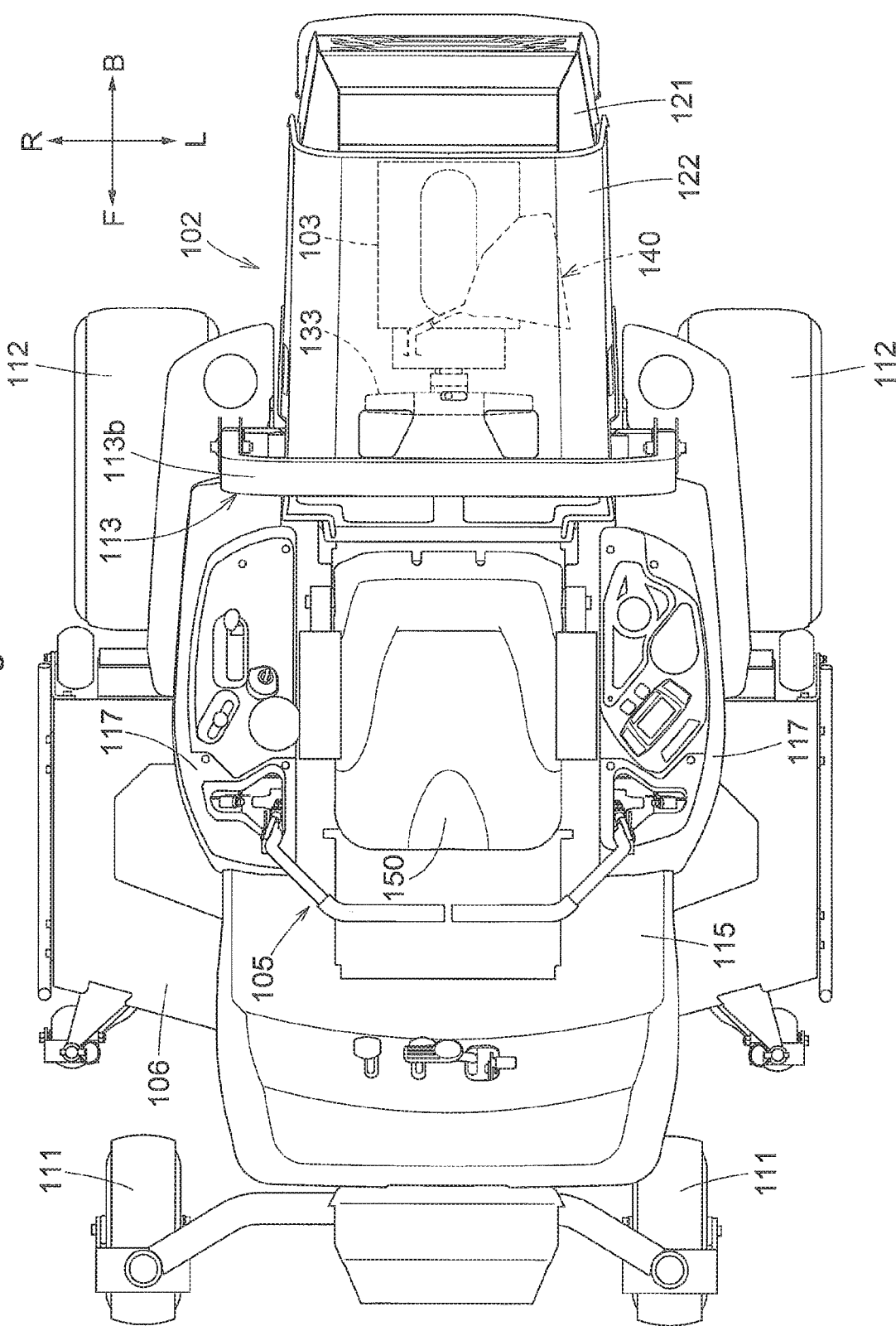
FIG. 9 is a plan view of the zero-turn mower.
Figure 10:
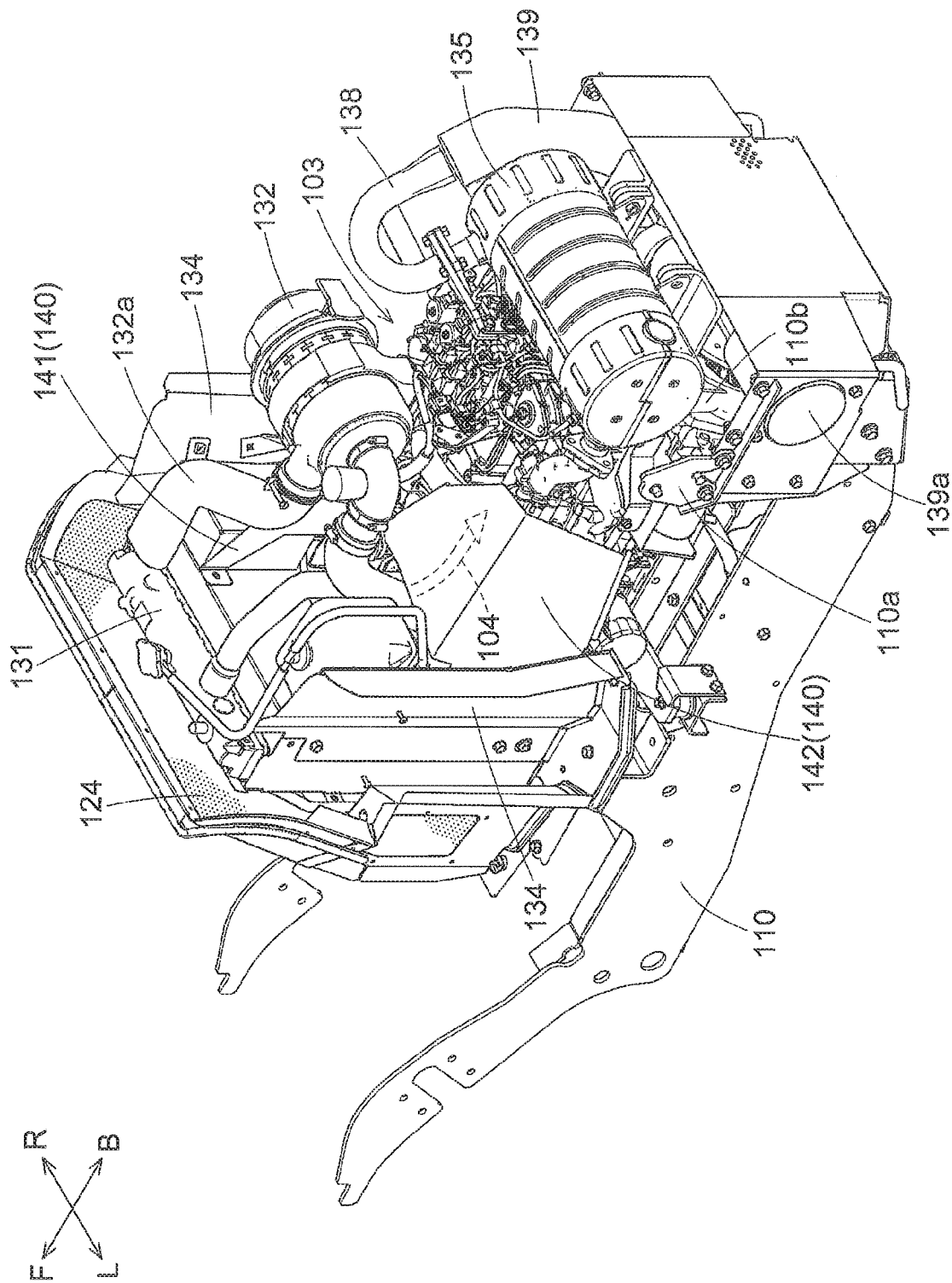
FIG. 10 is a perspective view showing a positional relationship between an engine, an emission gas purification device and a cooling air guiding path in an engine hood.

FIGS. 8 and 9 show a riding-type mower, which is an example of a work vehicle. FIG. 8 is a side view of a lawn mower, which is also called "a zero-turn mower" and is an example of a riding-type mower; and FIG. 9 is a plan view of the same.

The lawn mower includes a travelling vehicle body 101 that is supported on the ground by a front wheel unit that includes a pair of right/left front wheels 111 and a rear wheel unit (not shown) that includes a pair of right/left rear wheels 112 that are driven to rotate. The travelling vehicle body 101 includes a vehicle body frame 110 acting as a base member; and a mower unit 106 is suspended from the vehicle body frame 110, at a position between the front wheels 111 and the rear wheels 112, via a linkage mechanism 114. The mower unit 106 has a well-known configuration of a rear discharge type that discharges mown grass from the rear side.

A driving section 105 is provided in a central area of the travelling vehicle body 101 in the front-rear direction relative to the vehicle body. The driving section 105 includes a driver's seat 150. Fenders 117 are formed on the right and left sides of the driver's seat 150, and a step 115 is formed in front of the driver's seat 150.

The driver's seat 150 is located above a central area of the vehicle body frame 110; a transmission 116 is located below the driver's seat 150; and a rear axle of the rear wheel unit extends from a rear portion of the transmission 116 in a lateral direction across the vehicle body. A prime mover section 102 housing a diesel engine 103 (hereinafter abbreviated as "engine 103") is provided in an engine hood 120 in a rear portion of the driving section 105.

A ROPS device (a rollover protection system) 113 is provided at a position rearward of the driving section 105 and forward of the prime mover section 102. The ROPS device 113 has a gate shape that includes: a pair of right/left support columns 113a, with lower end portions thereof fixed to the vehicle body frame 110; and a horizontal member 113b extending continuous with and interconnecting the upper ends of the right and left support columns 113a.

Prime Mover Section

The prime mover section 102 is configured as follows.

The prime mover section 102 includes the engine hood 120, and the engine 103 is provided in an engine room that is covered by the engine hood 120. As peripheral equipment of the engine 103, a radiator 131, an air cleaner 132, a cooling fan 133 and an emission gas purification device 135 are provided in the engine room together with the engine 103.

The engine 103 is located in a central portion of the engine room in the front-rear direction, and the radiator 131 is located in the forefront portion of the engine room. The cooling fan 133 is located between the radiator 131 and the front surface of an engine body 130 of the engine 103. The air cleaner 132 is located above the engine body 130, and the emission gas purification device 135 is located above a rear portion of the engine body 130.

The engine hood 120 for defining the engine room includes: a stationary hood 121, which is a rear hood that is fixed to a rear end portion of the vehicle body frame 110; and a movable hood 122, which is a front hood that is openable and closable about an open/close axis x1 (see FIG. 8) that extends horizontally in a lateral direction across the vehicle body.

The movable hood 122 includes a pair of right/left side plates 122a defining lateral sides thereof, a top plate 122b defining an upper side thereof, and a front plate 122c defining a front side thereof; and the rear surface of the movable hood 122 is open. An air intake opening portion 123 is formed throughout the front plate 122c, and a dustproof net 124 is attached to the air intake opening portion 123. When the movable hood 122 is in a closed state, the air intake opening portion 123 is located so as to face a cooling surface of the radiator 131. Thus, the cooling fan 133 can take in cooling air from the front surface of the movable hood 122 via the cooling surface of the radiator 131.

The front plate 122c of the movable hood 122 and the dustproof net 124 attached to the air intake opening portion 123 of the front plate 122c are bent along a lateral bending line. Therefore, when the movable hood 122 is in a closed state, the lower half of the front plate 122c constitutes a vertical surface, whereas the upper half of the front plate 122c constitutes an inclined surface that is inclined rearward. As clearly shown in FIG. 11, air flowing space is formed between the front plate 122c of the movable hood 122 in a closed state and a seat back 151 in a seated state; and a horizontal cross-sectional area of the air flowing space increases in a substantially upward direction (see FIG. 11).

The stationary hood 121 serves as a downward-orienting deflector plate for changing the direction of the cooling air from the cooling fan 133, such that after the cooling air has passed through an area above the engine 103, it may passes through an area rearward of the emission gas purification device 135 and reaches an area below the emission gas purification device 135.

The radiator 131 is located in an area between the transmission 116 and the engine 103. A lower end of the radiator 131 is located above an input shaft (not shown) that transmits power from the engine 103 to the transmission 116; and an upper end of the radiator 131 protrudes to a position is higher than the air cleaner 132. A vertically center portion of the radiator 131 is located at substantially the same level as the upper surface of the engine body 130.

The cooling fan 133 is located in front of the engine 103 such that an upper end of a rotation circle (locus) thereof is located slightly higher than the upper surface of the engine body 130. The cooling fan 133 is positioned to be level with an upper region of a front wall of the engine body 130, and supported by a rotation shaft 133a that extends in the front-rear direction for receiving power transmitted from an extension portion of a crankshaft via a belt.

Figure 12:
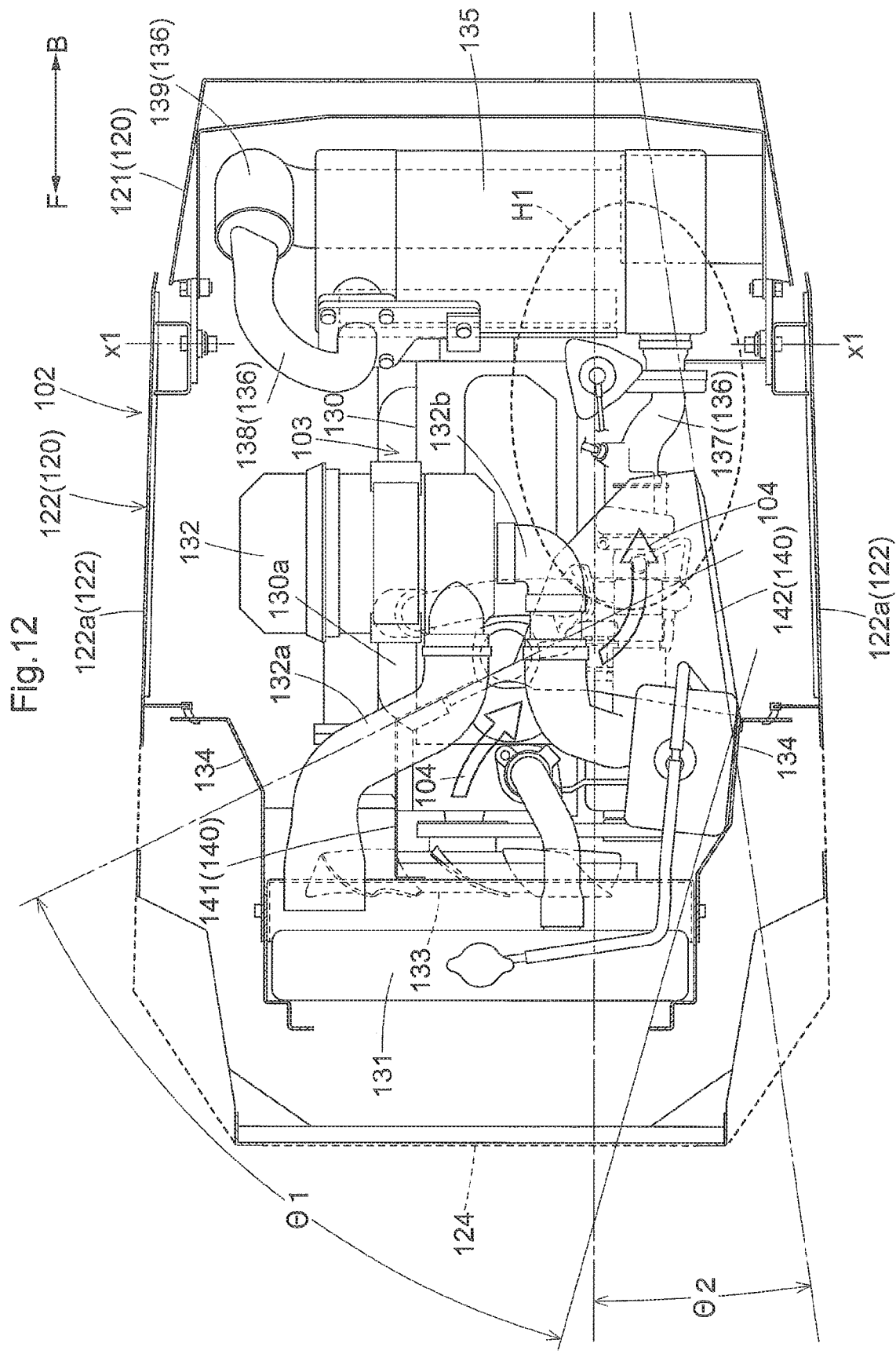
FIG. 12 is a plan view of the engine room.
Figure 13:
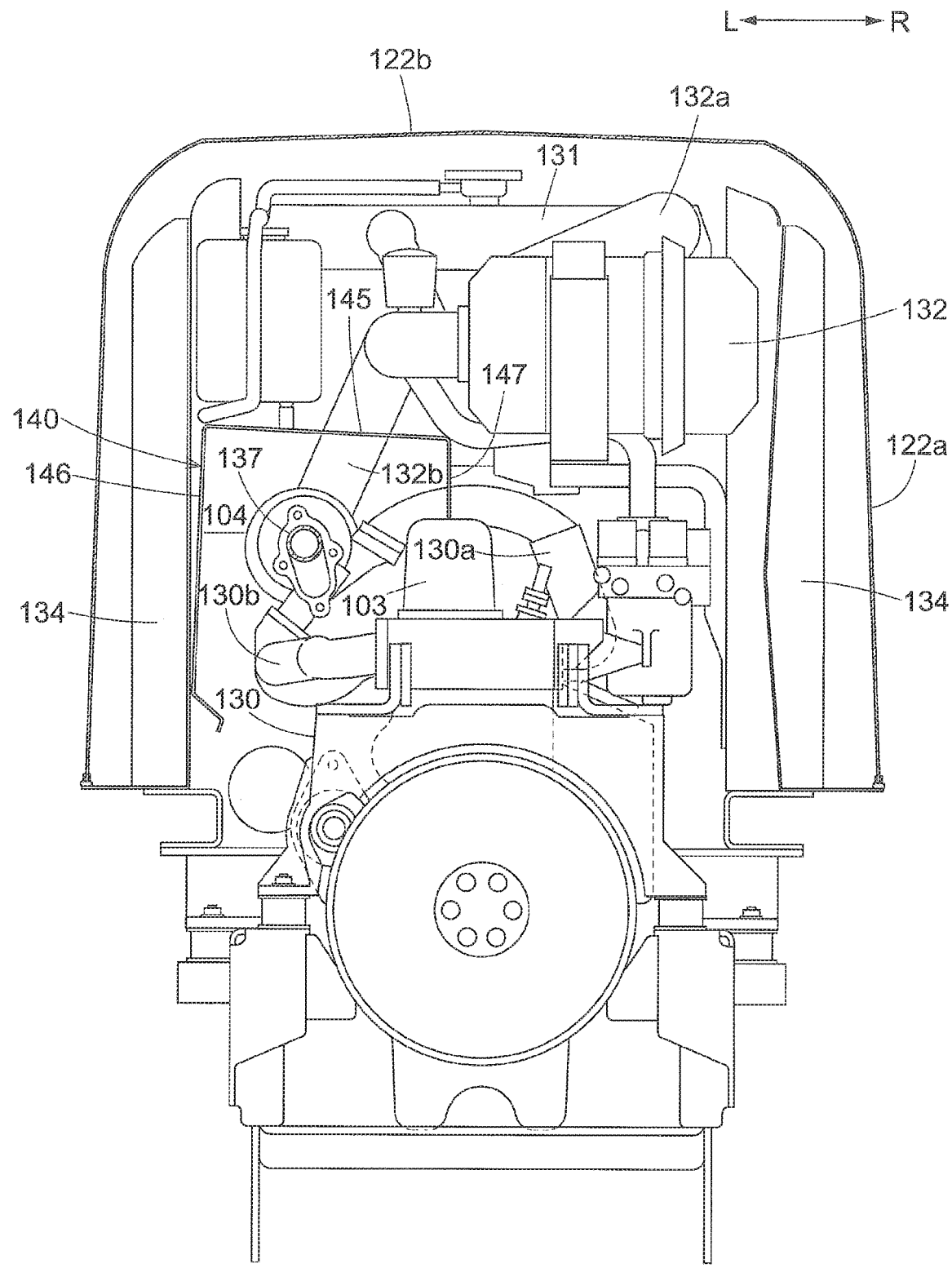
FIG. 13 is a view in section taken along XIII-XIII in FIG. 11.

The radiator 131 is located in front of the cooling fan 133. The radiator 131 stands upright, i.e. extends in the vertical direction, such that the cooling surface thereof faces the rotational locus plane of the cooling fan 133. A partition member 134 that also serves as a fan shroud is provided between the radiator 131 and the cooling fan 133. As shown in FIG. 12, right and left side portions of the partition member 134 extend to positions near the side plates 122a of the engine hood 120, and the partition member 134 partitions the engine room into an engine-side space and a radiator-side space.

As the cooling fan 133 is driven and rotated by the power from the engine 103, cooling air taken in from the above-described air flowing space goes through the radiator 131 and flows into an area in the engine room where the engine 103 is present. A portion of the cooling air flowed into the area in the engine room is collided with the front wall of the engine body 130 and diverges into right and left sides of the engine body 130; and another portion of the cooling air passes through an area above the engine body 130 and flows into an upper space in the engine room.

The air cleaner 132 is located above the engine body 130 in a horizontal orientation, which air cleaner 132 has a cylindrical shape (i.e. a cylinder axis extends in a lateral direction across the vehicle body). An inflow pipe 132a of the air cleaner 132 extends slightly obliquely upward of the air cleaner 132 to extend through an upper portion of the partition member 134, and an intake port thereof reaches an upper end portion of the radiator 131 in the radiator-side space. An outflow pipe 132b of the air cleaner 132 extends downward while bending in a U shape, and is connected to an air intake manifold 130a of the engine 103.

The emission gas purification device 135 has a substantially cylindrical housing with substantially the same length as that of the engine 103 in a lateral direction of the vehicle body. The emission gas purification device 135 is supported by a supporting member 110b that stands upright from the vehicle body frame 110, such that the cylinder axis of the substantially cylindrical housing extends in a lateral direction across the vehicle body, and that the cylinder axis of the substantially cylindrical housing is located at substantially the same height as the upper surface of the engine body 130.

The emission gas purification device 135 houses a filter called "DPF" (diesel particulate filter; not shown) which collects a particulate matter contained in an emission gas exhausted from the engine 103. The emission gas purification device 135 is placed on an exhaust flow path 136 of an emission gas from the engine 103. The exhaust flow path 136 includes: an terminal exhaust pipe 139 forming a discharge port 139a from which an emission gas is discharged to the outside of the vehicle body; an upstream exhaust pipe 137 that connects an exhaust manifold 130b of the engine 103 and an inflow port of the emission gas purification device 135; and an intermediate exhaust pipe 138 that connects the terminal exhaust pipe 139 to an outflow port of the emission gas purification device 135. The exhaust flow path 136 is constituted by the spaces in these pipes.

Cooling air that has passed through an upper space above the engine body 130 in the engine room flows toward the emission gas purification device 135 on the rear side thereof by passing through a gap between the engine body 130 and the air cleaner 132 above the engine body 130, and through spaces on the right/left sides of the air cleaner 132. Since an imaginary line interconnecting upper ends of the air cleaner 132 and the emission gas purification device 135 is inclined downward in a rearward direction, the top plate 122b of the engine hood 120 is also inclined in the same direction. Therefore, cooling air passed through the upper half of the radiator 131 flows obliquely downward along the top plate 122b of the engine hood 120, and also drawn downward, due to the deflector plate effect produced by the rear wall of the stationary hood 121.

Also, cooling air, that has collided with the front wall of the engine body 130 and diverged into the right/left sides of the engine body 130, flows rearward along the right and left sides of the engine body 130; and then the cooling air comes into contact with the intermediate exhaust pipe 138 and the terminal exhaust pipe 139 while cooling the engine 103, to cool an emission gas discharged from the emission gas purification device 135.

Cooling Air Guiding Path

A cooling air guiding path 104 is provided inside the engine hood 120 for guiding a portion of cooling air from the cooling fan 133 to a high-temperature area H1, where the temperature of thermal radiation from the engine 103 and the temperature of thermal radiation from the emission gas purification device 135 are high.

The following describes the cooling air guiding path 104, and an air guide 140, which is a constituent element of the cooling air guiding path 104.

As shown in FIGS. 10 to 13, the cooling air guiding path 104 is located downstream in the direction in which the cooling fan 133 sends air. As indicated by arrows in FIGS. 11 and 12, the cooling air guiding path 104 is a flow path through which cooling air flows from an area in front of the engine body 130 to an area on the left side of the engine body 130. The cooling air guiding path 104 is constituted by a gap/space between the air guide 140 for controlling a direction in which cooling air from the cooling fan 133 is sent, and in-hood elements located upstream of the high-temperature area H1 shown in the figures, in the direction in which cooling air is sent.

The "in-hood elements" mentioned above refer to a portion of the left side of the engine body 130 that faces the air guide 140, and an area in which the partition member 134 is present, the partition member 134 extending rearward and obliquely outward from the left rear end of the radiator 131 to the left side of the engine hood 120.

The "high-temperature area" H1 refers to a high temperature area, where an upper portion of the engine body 130, the exhaust manifold 130b of the engine 103, the upstream exhaust pipe 137 that connects the exhaust manifold 130b to the inflow port of the emission gas purification device 135, the emission gas purification device 135 in itself, and so on are densely arranged.

Figure 14:
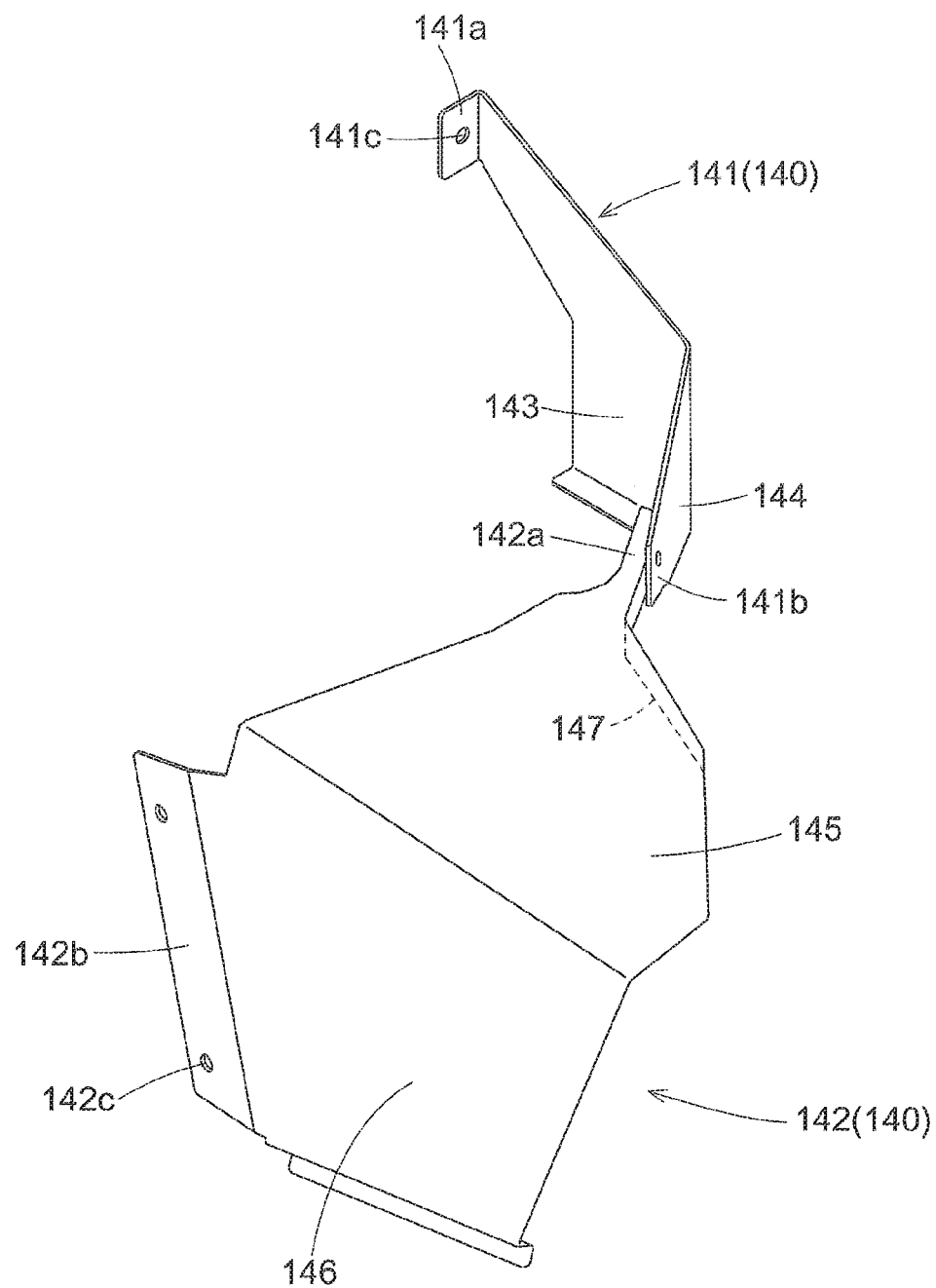
FIG. 14 is a perspective view showing an air guide.

As shown in FIG. 14, the air guide 140 includes a first guide plate 141 that is located upstream of the cooling fan 133 in the direction in which air is sent, and a second guide plate 142 that is located downstream of the first guide plate 141.

The first guide plate 141 is a plate-shaped member, and a front end portion of the first guide plate 141 includes a front coupling piece 141a that also serves as a frame to which the radiator 131 is attached, and abuts against the rear surface of the partition member 134; and a rear end portion of the first guide plate 141 includes a rear coupling piece 141b that is coupled to the second guide plate 142. The front coupling piece 141a of the first guide plate 141 is coupled to the partition member 134 at a position on the back side of the radiator 131, using coupling bolts (not shown) and bolt holes 141c provided in the front coupling piece 141a. The rear coupling piece 141b of the first guide plate 141 is coupled to a right coupling portion 142a, which will be described below, of the second guide plate 142, using coupling bolts (not shown).

A right end portion of a front end portion of the second guide plate 142 includes the right coupling portion 142a, which is coupled to the first guide plate 141, and a left end portion of the same includes a left coupling portion 142b, which is coupled to the partition member 134 that connects the left side portion of the radiator 131 to the left side of the engine hood 120. The left coupling portion 142b of the second guide plate 142 is also provided with bolt holes 142c, and is coupled to the partition member 134, using coupling bolts (not shown).

As shown in FIG. 12, the first guide plate 141 has a vertical plate shape that extends in a top-bottom direction. A front guide surface 143 thereof, which corresponds to the front half of the first guide plate 141, extends in the front-rear direction; and a rear guide surface 144 thereof, which corresponds to the rear half of the first guide plate 141, has a bent shape that extends downward and obliquely leftward. The rear guide surface 144 is wide in a top-bottom direction, and guides cooling air that has been sent from the cooling fan 133, to the left. That is, the rear guide surface 144 guides the cooling air that has been sent from the cooling fan 133, in a horizontal direction.

The rear guide surface 144 is formed such that the guiding surface portion of the rear guide surface 144 and the guiding surface portion of the partition member 134, which is located upstream of the second guide plate 142, form an angle θ1 in plan view, i.e. the rear guide surface 144 has a rearwardly narrowed shape, which is gradually narrowed in a downstream direction.

A lower portion of the front guide surface 143 of the first guide plate 141, which is located forward of an intermediate position of the front guide surface 143 in the front-rear direction, is cut out such that the cutout has a larger area than that in a portion that is located rearward of the intermediate position, and air is allowed to pass therethrough in the right/left direction.

As shown in FIGS. 10 to 13, the second guide plate 142 has an upper guide surface 145, which is wide and extends in a horizontal direction, a lateral guide surface 146 that has a vertical plate shape and extends downward from the left end of the upper guide surface 145, and a protruding piece 147 that is short and is bent downward from the right end of the upper guide surface 145.

As shown in FIG. 12, the second guide plate 142 is formed such that the guiding surface constituted by the lateral guide surface 146 that has a vertical plate shape, and the left side of the engine that is located to face the lateral guide surface 146, form an angle θ2 in plan view, i.e. the second guide plate 142 has a rearwardly narrowed shape, which is gradually narrowed in a downstream direction.

Figure 11:
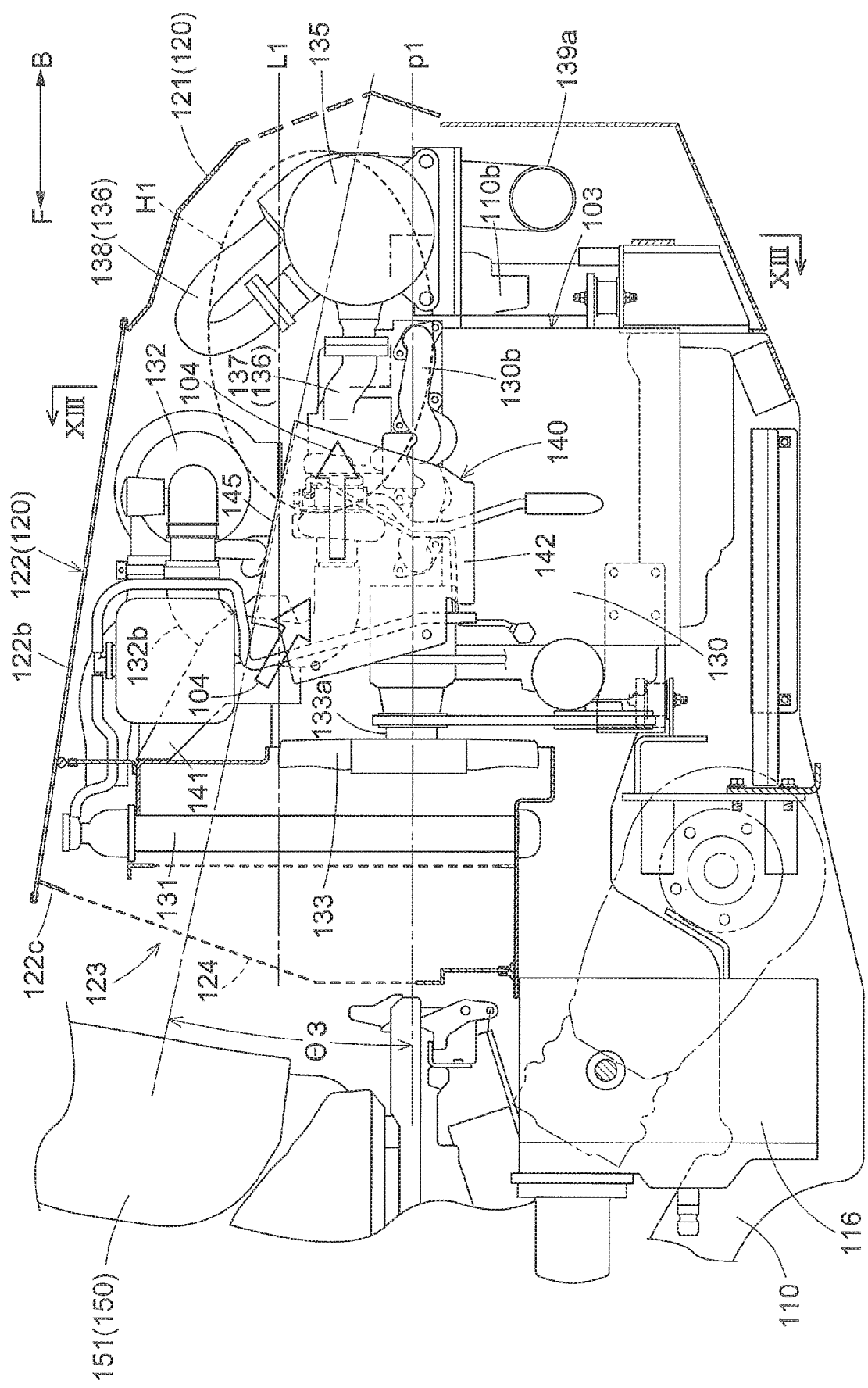
FIG. 11 is a side view of an engine room.

The upper guide surface 145 of the second guide plate 142 extends in a substantially horizontal direction. However, as shown in FIG. 11, in the front-rear direction, the upper guide surface 145 is inclined downward in a rearward direction, toward the downstream side in the direction in which air is sent. That is, the upper guide surface 145 is formed as an inclined surface that is inclined downward in a rearward direction so as to form an angle θ3 relative to a rotational axis p1 of the cooling fan 133 that extends in a horizontal direction, in side view. Thus, the second guide plate 142 guides cooling air that is sent from the cooling fan 133 to the high-temperature area H1 such that the cooling air flows slightly downward in a top-bottom direction.

The position of the upper guide surface 145 of the second guide plate 142 in terms of the height thereof in a top-bottom direction is located at, in side view, a position at which the upper guide surface 145 intersects an imaginary line L1 that connects the upper end of the rotation circle of the cooling fan 133 and the upper edge of the emission gas purification device 135 that is located at substantially the same height as the cooling fan 133.

The lower edge of the lateral guide surface 146 of the second guide plate 142 extends to a position that is downward of the exhaust manifold 130b that is located below the high-temperature area H1 in side view.

Other Embodiments Modified from Third Embodiment

The following describes only components that are different from those in the above-described embodiment.

(1) In the embodiment above, a structure in which the first guide plate 141 that guides cooling air in a horizontal direction and the second guide plate 142 that guides cooling air in a top-bottom direction are combined is illustrated as the air guide 140. However, the air guide 140 is not limited to such a structure.

For example, a structure into which the first guide plate 141 and the second guide plate 142 are integrated as one piece may be used. Also, the directions in which cooling air is guided are not limited to the combination of a horizontal direction and a top-bottom direction, and may be any directions, such as a combination of a horizontal direction and a horizontal direction, or a combination of a top-bottom direction and a top-bottom direction.

(2) In the embodiment above, a structure in which the first guide plate 141 and the second guide plate 142 are combined is illustrated as the air guide 140. However, the air guide 140 is not limited to such a structure, and the air guide 140 may include only the first guide plate 141, or only the second guide plate 142. Also, not only the first guide plate 141 and the second guide plate 142, another guide plate may be additionally included in the structure.

(3) In the embodiment above, a configuration in which cooling air from the cooling fan 133 is guided to the high-temperature area H1 that is located at one position in the engine hood 120 is illustrated. However, the present invention is not limited to such a configuration, and a structure by which cooling air from the cooling fan 133 is guided to high-temperature areas H1 at a plurality of positions in the engine hood 120 may be employed. If this is the case, the high-temperature areas H1 are not limited to the upper portion of the engine body 130, the upper portion of the engine body 130, the exhaust manifold 130b of the engine 103, the upstream exhaust pipe 137 that connects the exhaust manifold 130b to the inflow port of the emission gas purification device 135, and the emission gas purification device 135 in itself, and may be other high-temperature areas.

(4) In the embodiment above, a configuration in which both the first guide plate 141 and the second guide plate 142, which are used as the air guide 140, are formed such that the cooling air guiding path 104 has a rearwardly narrowed shape is illustrated. However, the present invention is not limited to such a configuration.

For example, it is possible to employ a configuration in which only one of the first guide plate 141 and the second guide plate 142 is formed such that the cooling air guiding path 104 has a rearwardly narrowed shape, or a configuration in which neither the first guide plate 141 nor the second guide plate 142 is formed such that the cooling air guiding path 104 has a rearwardly narrowed shape.

(5) In the embodiment above, the work vehicle is a riding-type mower. However, the present invention is applicable to other kinds of work vehicles such as a tractor.

What is claimed is:

1. A work vehicle comprising:
    a vehicle body;
    an engine hood that is installed in a rear portion of the vehicle body;
    a diesel engine that is provided in the engine hood;
    a cooling fan that is located in the engine hood at a position forward of the diesel engine;
    an emission gas purification device that is provided rearward of the diesel engine in the engine hood, the emission gas purification device being configured to collect particulate matter contained in an emission gas from the diesel engine;
    an exhaust flow path extending through an exhaust manifold of the diesel engine to the emission gas purification device along a lateral side surface of the diesel engine;
    a cooling air guiding path that is provided in the engine hood, the cooling air guiding path being configured to guide a portion of cooling air from the cooling fan to a heat radiation area to which heat is radiated in a vicinity of a position at which the exhaust flow path and the emission gas purification device are connected with each other;
    an air guide that is provided in and separate from the engine hood for guiding the cooling air; and
    an in-hood element that is provided in the engine hood, at a position upstream of the heat radiation area in a direction in which the cooling air is sent,
    wherein the cooling air guiding path is constituted by a gap between the air guide and the in-hood element,
    wherein the in-hood element is in a form of the lateral side surface of the diesel engine which lateral side surface faces the exhaust manifold disposed upstream of the heat radiation area in the direction in which the cooling air is sent,
    wherein the air guide has a lateral guide surface facing the lateral side surface and gradually closer to the lateral side surface toward a downstream side in the direction in which the cooling air is sent, and
    wherein the gap has a rearwardly narrowed shape that is gradually narrowed toward the downstream side in the direction in which the cooling air is sent.

2. The work vehicle according to claim 1, wherein the air guide includes a first guide plate that is configured to guide cooling air from the cooling fan in a horizontal direction, and a second guide plate that is configured to guide the cooling air in a top-bottom direction.

3. The work vehicle according to claim 2, wherein
    the engine hood is pivotable to be opened/closed about a pivot extending at a rear position thereof,
    the second guide plate has an upper guide surface that is located in an upper portion of the cooling air guiding path, and
    the upper guide surface is inclined downward in a rearward direction.

4. The work vehicle according to claim 1, further comprising:
    a radiator that is located forward of the cooling fan; and
    a partition member that extends from a rear end of the radiator to one lateral side of the engine hood,
    wherein the in-hood element is constituted by one lateral side of the diesel engine, and the partition member, the lateral side facing the air guide.

5. The work vehicle according to claim 4,
    wherein the partition member extends to a gap between the cooling fan and the radiator, and serves as a fan shroud.

* * * * *